United States Patent [19]
Lee

[11] Patent Number: 5,969,751
[45] Date of Patent: Oct. 19, 1999

[54] METHOD AND APPARATUS FOR CANCELING CO-CHANNEL INTERFERENCE

[75] Inventor: Myeong-hwan Lee, Suwon, Rep. of Korea

[73] Assignee: Samsung Electronics Co., Ltd., Kyungi-do, Rep. of Korea

[21] Appl. No.: 09/078,810

[22] Filed: May 14, 1998

[30] Foreign Application Priority Data

Jul. 9, 1997 [KR] Rep. of Korea ........................ 97-31727

[51] Int. Cl.⁶ ........................................ H04N 5/38
[52] U.S. Cl. .............................................. 348/21; 348/614
[58] Field of Search ............................ 348/21, 614, 607, 348/470, 725, 723, 426, 390; 375/348–350

[56] References Cited

U.S. PATENT DOCUMENTS

| | | | |
|---|---|---|---|
| 5,532,755 | 7/1996 | Patel et al. | 348/614 |
| 5,546,132 | 8/1996 | Kim et al. | 348/21 |
| 5,594,496 | 1/1997 | Nielsen et al. | 348/21 |
| 5,602,602 | 2/1997 | Hulyalkar | 375/350 |
| 5,745,187 | 4/1998 | Hulyalkar et al. | 348/21 |
| 5,777,692 | 7/1998 | Ghosh | 348/21 |
| 5,793,417 | 8/1998 | Lee | 348/21 |
| 5,821,988 | 10/1998 | Citta et al. | 348/21 |
| 5,886,748 | 3/1999 | Lee | 348/614 |

FOREIGN PATENT DOCUMENTS

| | | | |
|---|---|---|---|
| 59-224985 | 12/1984 | Japan | H04N 5/48 |
| 6-502520 | 3/1994 | Japan | H04N 7/00 |

*Primary Examiner*—Victor R. Kostak
*Attorney, Agent, or Firm*—Sughrue, Mion, Zinn, Macpeak & Seas, PLLC

[57] ABSTRACT

A co-channel interference canceler and a method therefor. The co-channel interference canceler includes: an NTSC interference rejection filter (NRF) for removing co-channel interference from an input signal; a noise reducer for reducing noise by removing interference other than co-channel interference from the input signal; and a selection controller for determining whether or not co-channel interference exists in the signal output from the noise-reducer and selecting the NRF when such co-channel interference exists in the noise reduced signal. Therefore, the effect from interference other than the co-channel interference is minimized, so that the co-channel interference controller is reliably controlled.

20 Claims, 4 Drawing Sheets

METHOD AND APPARATUS FOR CANCELING CO-CHANNEL INTERFERENCE

BACKGROUND OF THE INVENTION

1. Field of the Invention

The present invention relates to an apparatus and a method for cancelling co-channel interference. More particularly, the invention relates to a co-channel interference canceler and a method therefor, which reliably cancel co-channel interference in a high definition television (HDTV).

2. Description of the Related Art

Grand Alliance-Advanced Television (GA-ATV) is a new digital television transmission system standard capable of replacing the NTSC (National Television System Committee) standard. The GA-ATV system (also called "GA-HDTV" or "GAVSB") is standardized by the Advanced Television System Committee (ATSC) and adopts a vestigial side band (VSB) modulation method as a digital transmission method.

A new ATV signal is transmitted together with a conventional analog television signal (NTSC signal) via a television channel which is not in use in a given geographic region ("taboo" channel). Accordingly, a GA-ATV receiver must be designed to resist NTSC co-channel interference.

The block diagram of a conventional HDTV receiver is shown in FIG. 1, which is disclosed in U.S. Pat. No. 5,594,496.

An NTSC interference rejection filter (NRF) selection controller 110 of FIG. 1 may be constituted of a field comb filter, a comb filter and a comparator disclosed in the above patent, and may have a structure disclosed in the reference [1] "Guide to the use of the digital television standard for HDTV transmission", pp.104~107, Doc.A/54, submitted to the United States Advanced Television System Committee, Apr. 12, 1995, or may have another structure.

Here, when adopting the comb filter suggested by the above patent and ATSC standards as the NRF 108, performance in removing the NTSC interference signal is excellent.

However, since the comb filter subtracts two signals at full gain, the power of additive white Gaussian noise (AWGN) is increased by 3 dB, thereby causing a loss of signal-to-noise ratio (SNR) of 3 dB while passing through the comb filter. Also, the comb filter changes the 8-level input signal to a 15-level signal.

The NRF selection controller 110 of FIG. 1 generates a selection signal which selects the path with less error from a path (non-NRF path) which does not include the NRF 108 and a path (NRF path) including the NRF 108. The controller applies the result to a selector 112, an adaptive equalizer 114, a phase tracker 116 and a trellis decoder 118. The selector 112 selects the output signal (15-level) of the NRF 108 or the output signal (8-level) of a unit 106, according to the selection signal. The adaptive equalizer 114, the phase tracker 116 and the trellis decoder 118 properly process the selected signal.

Thus, the selection of the NRF 108 by the NRF selection controller 110 of the receiver shown in FIG. 1 is performed before the adaptive equalizer 114, the phase tracker 116 and the trellis decoder 118, which means that the input signal into the NRF selection controller 110 includes AWGN, ghost, phase noise, etc. as well as the co-channel interference signal. To solve this problem, according to the above patent, the input signal, including a field sync of successive fields, is comb-filtered by using a field comb filter to generate a subtraction signal from which static ghost, DC offset, symbol interference, etc. has been removed. The NRF is selected by comparing the comb-filtered subtraction signal with a subtraction signal which does not go through the comb filter, thereby removing the NTSC co-channel interference and other interference.

However, in the above patent, moving ghost or phase noise is not removed, so reliability in controlling selection of the NRF is still less than optimal.

On the other hand, as another conventional co-channel interference canceler, U.S. Pat. No. 5,546,132 discloses an NTSC interference detector using received data over all periods instead of a data field sync reference pattern. U.S. Pat. No. 5,602,583 discloses an NTSC interference rejection filter with a switched Tomlinson precoder for reducing the NTSC co-channel interference in the ATV receiver, and U.S. Pat. No. 5,325,188 discloses an NTSC signal interference canceler using digital recursive notch filters.

SUMMARY OF THE INVENTION

To solve the above problems of the first conventional device, it is an object of the present invention to provide a highly reliable co-channel interference canceler which removes the co-channel interference signal after removing other interference signals from an input signal including both the co-channel interference signal and other interference signals.

It is another object of the present invention to provide a highly reliable method for canceling the co-channel interference by removing the co-channel interference signal after removing other interference signals from an input signal including both the co-channel interference signal and other interference signals.

To achieve the first object, there is provided a co-channel interference canceler comprising: an NTSC interference rejection filter (NRF) for removing co-channel interference from an input signal; a noise reducer for reducing noise by removing interference other than co-channel interference from the input signal; and a selection controller for determining whether or not co-channel interference exists in the signal output from the noise reducer and for generating a selection signal for selecting the NRF to remove co-channel interference to provide an input to the noise reducer based on a result of the determination.

To achieve the second object, there is provided a method for canceling co-channel interference, comprising the steps of: (a) outputting a noise reduced signal by removing interference other than co-channel interference from an input signal; (b) determining whether or not the noise reduced signal contains co-channel interference and generating a selection signal based on the result of the determination; and (c) removing co-channel interference from the input signal according to the selection signal.

BRIEF DESCRIPTION OF THE DRAWINGS

The above objects and advantages of the present invention will become more apparent from detailed descriptions of preferred embodiments thereof with reference to the attached drawings in which.

DESCRIPTION OF THE PREFERRED EMBODIMENT

Figure 2:
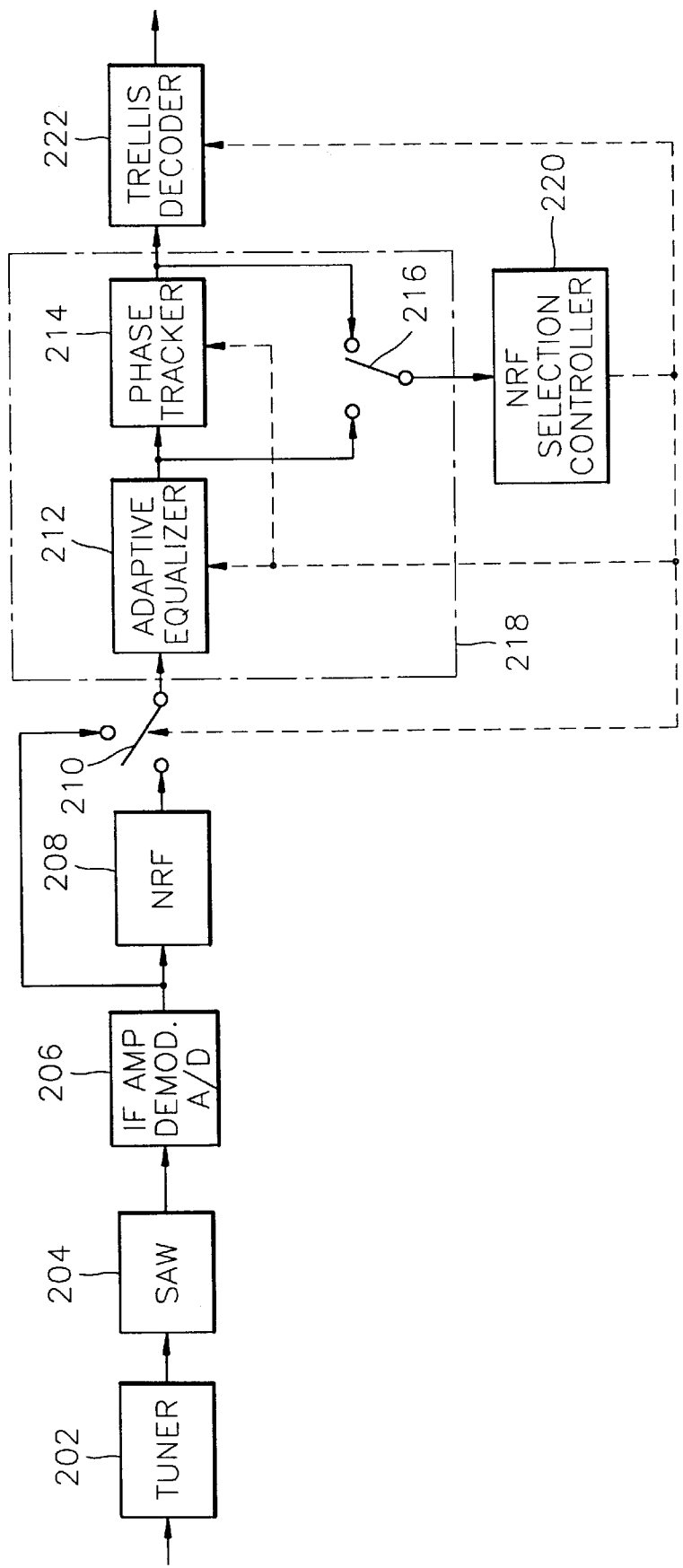
FIG. 2 is a block diagram of an HDTV including a co-channel interference canceler according to the present invention.

In FIG. 2, a tuner 202 converts a high definition television (HDTV) signal input via an antenna into an intermediate frequency (IF) signal of a predetermined frequency. A signal of an adjacent channel often interferes with the signal of a desired channel. Thus, in order to prevent the interference, the output of the tuner 202 passes through a surface acoustic wave (SAW) filter 204 having a 6MHz band width. A unit 206 adjusts the amplitude of the IF signal, demodulates the IF signal using a pilot signal included in the IF signal into a base band signal, and converts the demodulated signal into digital data.

An NTSC interference rejection filter (NRF) 208 removes the NTSC component from the output of the unit 206 in order to prevent deterioration of the HDTV signal by co-channel interference of the NTSC signal. Here, the NRF 208 may be constituted of a comb filter disclosed in the ATSC standards and in U.S. Pat. No. 5,594,496, or other various types of filters such as a finite impulse response (FIR) filter or a notch filter disclosed in U.S. Pat. No. 5,325,188.

A first selector 210 selects the output of the NRF 208 or the output of the unit 206, which has not passed through the NRF, according to a selection signal output from the NRF selection controller 220. An adaptive equalizer 212 removes multipath distortion (so-called "ghost") caused in the transmission channel, by adapting to the state of the selected signal. A phase tracker 214 removes phase noise from the equalized signal, i.e., phase error, output from the adaptive equalizer 212. A trellis decoder 222 performs trellis decoding on the output of the phase tracker 214.

The idea of the present invention is to increase the reliability in controlling selection of the NRF 208 by removing other interference signals included in an input signal, so that a signal containing only co-channel interference is input to the NRF selection controller 220 in order to determine whether or not the input signal contains co-channel interference, thereby controlling the selection of the NRF 208.

Figure 1:
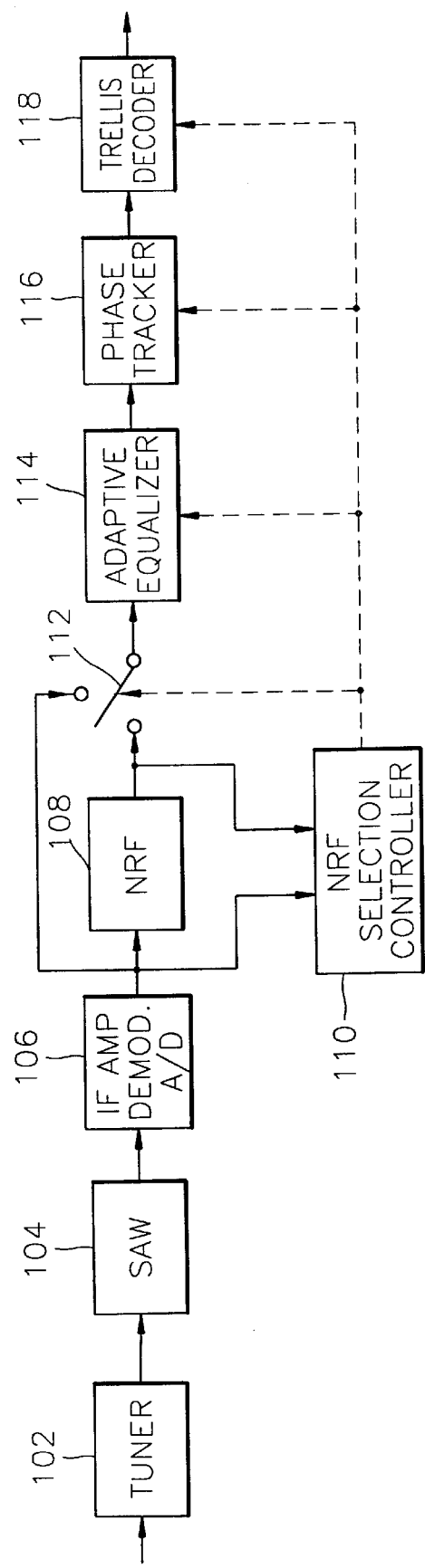
FIG. 1 is a block diagram of an HDTV including a conventional co-channel interference canceler.

Unlike the conventional HDTV receiver of FIG. 1 which uses the input and output signal of the NRF 108 as inputs of the NRF selection controller 110, the output of the adaptive equalizer 212 or phase tracker 214 is input to the NRF selection controller 220 via a second selector 216. The input signal of the NRF selection controller 220 is basically the signal from which the ghost and phase noise have been removed, by the adaptive equalizer 212 and phase tracker 214, respectively.

Here, the adaptive equalizer 212, the phase tracker 214 and the second selector 216 form a post processor 218. The post processor 218 may further include a unit capable of removing interference other than the co-channel interference, such as a unit for reducing AWGN, in addition to the adaptive equalizer 212 and the phase tracker 214.

Thus, interference other than the co-channel interference is largely removed or reduced by the post processor 218. The NRF selection controller 220 generates a selection signal which selects the path with less error from the NRF path and the non-NRF path, based on the output of the post processor 218, thereby controlling the first selector 210, the adaptive equalizer 212, the phase tracker 214 and the trellis decoder 222.

Figure 3:
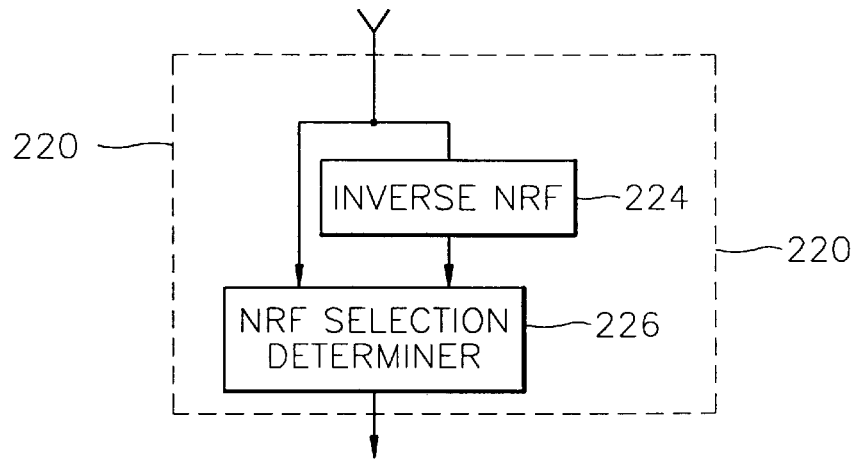
FIG. 3 shows an example of an NRF selection controller shown in FIG. 2.

FIG. 3 is a diagram showing the NRF selection controller 220 of FIG. 2 according to a first embodiment of the present invention, which operates only at the initial state of resetting the system.

When co-channel interference is included in the input signal at the initial state, the post processing by the adaptive equalizer 212 and the phase tracker 214 shown in FIG. 2 may not operate properly. In order to prevent this problem, when the first selector 210 selects the output of the NRF 208 such that the co-channel interference is removed, the post processing is properly performed regardless of the co-channel interference. In this matter, other interference such as ghost and phase noise are removed. Thus, in the initial state, the first selector 210 is initialized to select the output of the NRF 208. As a result, the post processor 218 operates correctly independently of the co-channel interference.

In the initial state, the signal input to an inverse NRF 224 and an NRF selection determiner 226 of FIG. 3 is the signal processed by the post processor 218. The input signal is one from which the co-channel interference and other interference have been reduced or removed. The inverse NRF 224 has the inverse characteristics of the NRF 208. Thus, the NRF selection determiner 226 generates a selection signal which selects the path of the better condition by comparing the NRF path via the NRF 208, output from the post processor 218, with the path output from the inverse NRF 224, which corresponds to a non-NRF path representing a signal which has not passed through the NRF 208.

In most of the cases for determining selection of the NRF 208 performed by the NRF selection determiner 226, the channel conditions of the NRF path and non-NRF path are detected using data of a known signal period (data of the field synchronization ("sync") segment interval in the case of GA-VSB), to select the path with the better condition. Methods other than the minimum energy method suggested in the reference [1] may also be used, and are known to those skilled in the art.

Usually the channel conditions do not change continuously. Thus, it is enough to perform the selection of the NRF 208 only at the initial state of resetting the system. However, in consideration of mobile media, the selection control of the NRF 208 must be performed by continuously checking the channel state. In this case, if the first selector 210 of FIG. 2 selects the non-NRF path, the signal of the NRF path is not input to the NRF selection determiner 226 of FIG. 3. This makes it impossible to generate the correct selection signal for the NRF 208.

Figure 4:
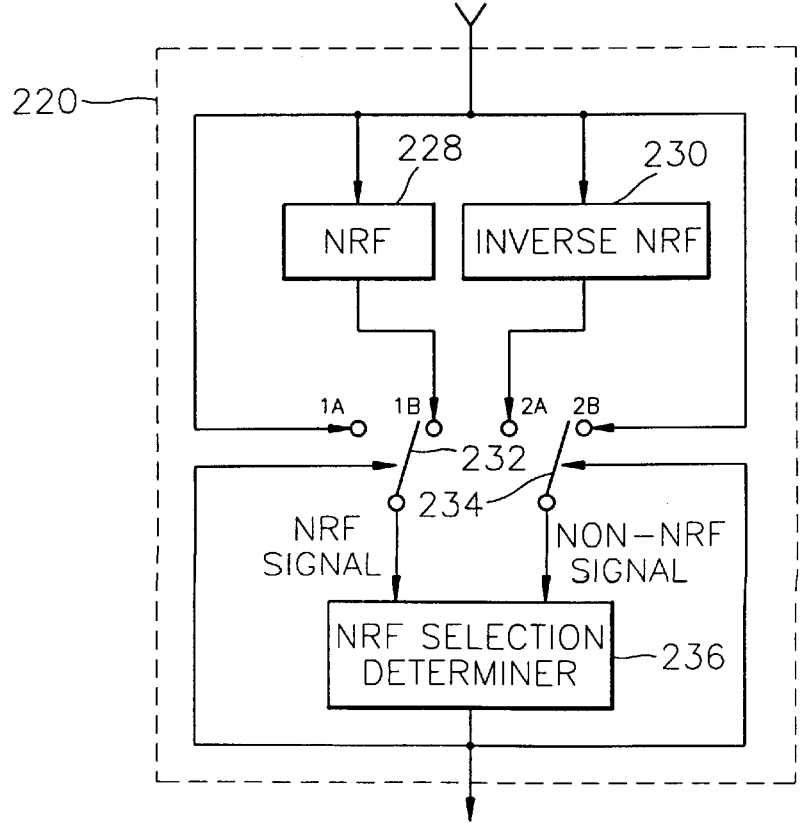
FIG. 4 shows another example of the NRF selection controller shown in FIG. 2.

Thus, in a second embodiment, the NRF selection controller 220 is constituted as shown in FIG. 4 such that it operates regardless of whether or not its input signal has passed through the NRF 208. This is because the input characteristics of the NRF selection controller 220 is changed as the first selector 210 selects the non-NRF path if the NRF selection controller 220 selects the non-NRF path.

More particularly, if the output of the post processor 218 shown in FIG. 2 is an NRF-signal, then a first selection switch 232 selects the unmodified output of the post processor 218 from a contact point 1A, that is, the NRF path, and a second selection switch 234 selects the output of the inverse NRF 230 from a contact point 2A, that is, the non-NRF path. If the output of the post processor 218 of FIG. 2 is a non-NRF signal, the first selection switch 232 selects the output of an NRF 228 from a contact point 1B, that is, the NRF path, and the second selection switch selects the unmodified output of the post processor 218 from a contact point 2B, that is, the non-NRF path.

An NRF selection determiner 236 always selects the path with the better condition by receiving the NRF-path from the first selection switch 232 as an NRF comparison signal and the non-NRF path from the second selection switch 234 as a non-NRF comparison signal, and controls the first and second selection switches 232 and 234 by feeding back the selected result thereto. At the same time, the NRF selection determiner 236 continuously controls the first selector 210 of FIG. 2 using the post-processed signal. Here, the first and second selection switches 232 and 234 are embodied by a digital logic circuit such as a multiplexer.

Figure 5A:
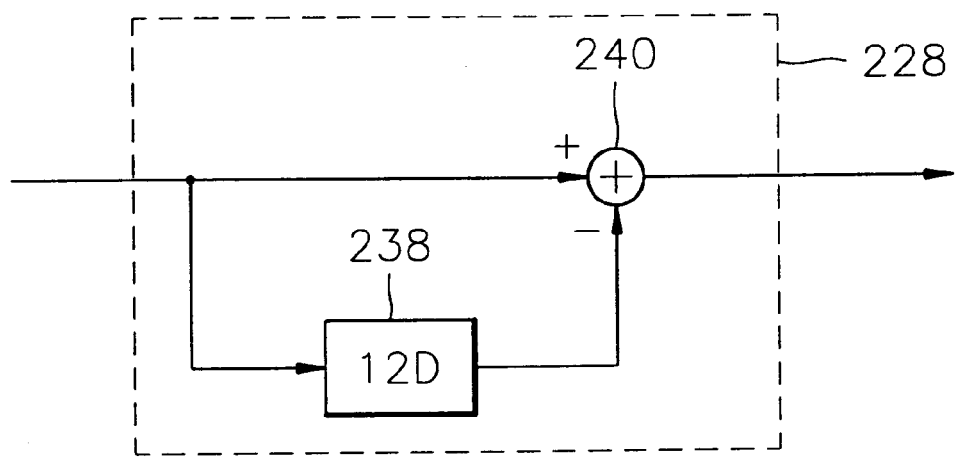
FIGS. 5A and 5B are examples of an NRF and an inverse NRF, respectively, shown in FIG. 4.

FIG. 5A shows an example of the NRF 228 of FIG. 4. A comb filter may be implemented by a subtractor 240 for subtracting a signal delayed by a 12 symbol delay (12D) 238 from the signal output by the post processor 218. Here, in consideration of the relationship with a precoder in a transmitter, the comb filter with 12D is used.

Figure 5B:
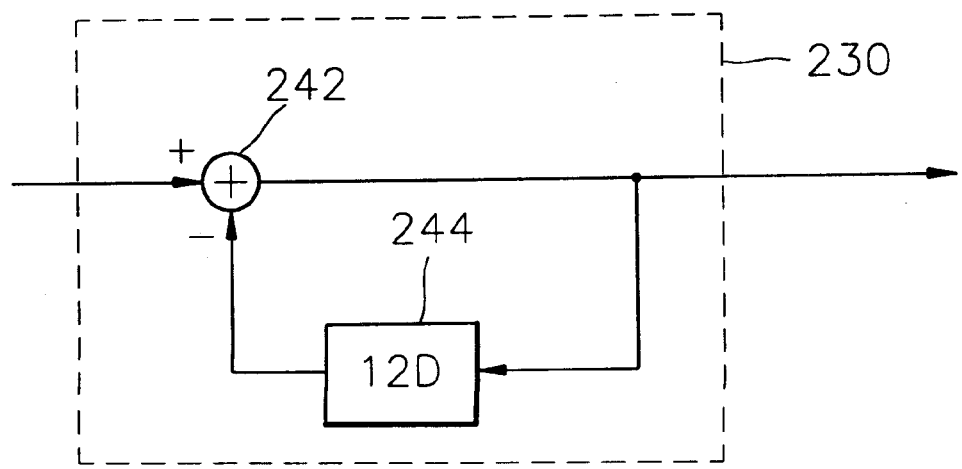

FIG. 5B shows an example of the inverse NRF 230 of FIG. 4. The subtractor 242 subtracts a signal delayed by a 12 symbol delay (12D) 244 from the signal output by the post processor 218, and the result of the subtraction is fed back to the 12D 244.

As described above, in the co-channel interference canceler and the method therefor according to the present invention, the effect of interference other than the co-channel interference is minimized, Therefore, error in selection of the NRF which may be caused by such other interference can be prevented. This enhances reliability in controlling the selection of the NRF.

What is claimed is:

1. A co-channel interference canceler comprising:
   a first NTSC interference rejection filter (NRF) for removing co-channel interference from an input signal;
   a noise reducer for reducing noise by removing interference other than co-channel interference from the input signal; and
   a selection controller for determining whether or not co-channel interference exists in an output signal from the noise reducer and for generating a selection signal for selecting the first NRF as an input for the noise reducer when co-channel interference exists in the output signal.

2. The co-channel interference canceler of claim 1, wherein the noise reducer outputs a noise-reduced NRF signal by removing other interference included in a signal which has passed through the first NRF for an initial state of the canceler.

3. The co-channel interference canceler of claim 2, wherein the selection controller comprises:
   an inverse NRF having inverse characteristics of the first NRF for processing the noise reduced NRF signal and outputting a non-NRF signal; and
   a determiner for generating a selection signal by selecting the signal with less error from the noise reduced NRF signal and the non-NRF signal.

4. The co-channel interference canceler of claim 2, wherein the selection controller comprises:
   a second NRF for performing NRF filtering on a noise reduced signal which has not passed through the first NRF;
   an inverse NRF for performing an inverse NRF function on the noise reduced NRF signal;
   a first selector for outputting either the noise reduced NRF signal or an output of the second NRF as an NRF comparison signal according to the selection signal;
   a second selector for outputting either the noise reduced signal or an output of the inverse NRF as a non-NRF comparison signal according to the selection signal; and
   a determiner for generating the selection signal by selecting the signal with less error from the NRF comparison signal and the non-NRF comparison signal.

5. A co-channel interference canceler comprising:
   a first NTSC interference rejection filter (NRF) for outputting a second input signal by removing co-channel interference from a first input signal, said first input signal including co-channel interference and other interference;
   a selector for selecting either the first input signal or the second input signal according to a selection signal and for outputting the selected signal;
   a post processor for removing the other interference from the selected signal and for outputting a post-processed signal; and
   a selection controller for generating the selection signal by determining whether or not the post-processed signal contains co-channel interference.

6. The co-channel interference canceler of claim 5, wherein the selection controller selects the second input signal for an initial state of the canceler.

7. The co-channel interference canceler of claim 6, wherein the selection controller comprises:
   an inverse NRF having inverse characteristics of the first NRF for processing the post-processed second input signal output from the post processor at the initial state, and outputting a non-NRF signal; and
   a determiner receiving the non-NRF signal and the post-processed second input signal and generating the selection signal by selecting the signal with less error from the post-processed second input signal and the non-NRF signal.

8. The co-channel interference canceler of claim 5, wherein the selection controller comprises:
   a second NRF for performing NRF filtering on the post-processed signal which has not passed through the first NRF;
   an inverse NRF for performing an inverse NRF function on the post-processed signal which has passed through the first NRF;
   a first selector for outputting either the post-processed signal or an output of the second NRF as an NRF comparison signal according to the selection signal;
   a second selector for outputting either the post-processed signal or an output of the inverse NRF as a non-NRF comparison signal according to the selection signal; and
   a determiner for generating the selection signal by selecting the signal with less error from the NRF comparison signal and the non-NRF comparison signal.

9. The co-channel interference canceler of claim 5, wherein the post processor comprises at least an adaptive equalizer for removing ghost interference included in the selected signal.

10. The co-channel interference canceler of claim 5, wherein the post processor comprises at least:

an adaptive equalizer for removing ghost interference included in the selected signal to output an equalized signal; and a phase tracker for removing phase noise from the equalized signal.

11. A method for canceling co-channel interference, comprising the steps of:
(a) outputting a noise reduced signal by removing interference other than co-channel interference from an input signal;
(b) determining whether or not the noise reduced signal contains co-channel interference and generating a selection signal based on the result of the determination; and
(c) removing co-channel interference from the input signal according to the selection signal.

12. The method of claim 11, wherein in the step for removing co-channel interference, the co-channel interference is removed by performing an NRF process on the input signal for an initial state to produce a noise reduced NRF signal.

13. The method of claim 12, wherein the step for generating the selection signal comprises the sub-steps of:
(b1) outputting a non-NRF signal by processing the noise reduced NRF signal to have the inverse characteristics of the NRF process; and
(b2) generating a selection signal by selecting the signal with less error from the noise reduced NRF signal and the non-NRF signal.

14. The method of claim 11, wherein the step for generating the selection signal comprises the sub-steps of:
(b1) performing an NRF process on the noise reduced signal;
(b2) performing an inverse NRF process on the noise reduced signal which has previously undergone an NRF process to remove co-channel interference;
(b3) outputting either the noise reduced signal or the signal obtained in the step (b1) as an NRF comparison signal according to the selection signal;
(b4) outputting either the noise reduced signal or the signal obtained in the step (b2) as a non-NRF comparison signal according to the selection signal; and
(b5) generating the selection signal by selecting the signal with less error from the NRF comparison signal and the non-NRF comparison signal.

15. A method for canceling co-channel interference, comprising the steps of:
(a) outputting a second input signal by performing an NRF process on a first input signal, said first input signal including co-channel interference and other interference;
(b) selecting either the first input signal or the second input signal according to a selection signal, and outputting the selected signal;
(c) outputting a post-processed signal by removing the other interference from the selected signal; and
(d) generating the selection signal by determining whether or not the post-processed signal contains co-channel interference.

16. The method of claim 15, wherein in the step (b), the second input signal is selected for an initial state of the canceler.

17. The method of claim 16, wherein the step (d) comprises the sub-steps of:
(d1) outputting a non-NRF signal at the initial state by processing a post-processed second input signal to have the inverse characteristics of the NRF process; and
(d2) generating the selection signal by selecting the signal with less error from the post-processed second input signal and the non-NRF signal.

18. The method of claim 15, wherein the step (d) comprises the sub-steps of:
(d1) performing an NRF process on the post-processed signal;
(d2) performing an inverse NRF process on the post-processed signal which has previously undergone an NRF process;
(d3) outputting as an NRF comparison signal either the post-processed signal or the signal processed in the step (d1), according to the selection signal;
(d4) outputting as a non-NRF comparison signal either the post-processed signal or the signal processed in the step (d2), according to the selection signal; and
(d5) generating the selection signal by selecting the signal with less error from the NRF comparison signal and the non-NRF comparison signal.

19. The method of claim 15, wherein the step (c) comprises at least the sub-step of removing ghost interference from the selected signal.

20. The method of claim 15, wherein the step (c) comprises at least the sub-steps of:
(c1) outputting an equalized signal by removing ghost interference from the selected signal; and
(c2) removing phase noise from the equalized signal.

* * * * *